(12) United States Patent
Silvestri et al.

(10) Patent No.: US 9,989,005 B1
(45) Date of Patent: Jun. 5, 2018

(54) METHOD AND APPARATUS FOR MODIFYING AN AUTOMOBILE ENGINE CONTROL UNIT

(71) Applicant: 128 Combustion, Inc., Park City, UT (US)

(72) Inventors: Chester J. Silvestri, Los Gatos, CA (US); Kendall J. Mosher, Fort Collins, CO (US)

(73) Assignee: 128 Combustion, Inc., Park City, UT (US)

( * ) Notice: Subject to any disclaimer, the term of this patent is extended or adjusted under 35 U.S.C. 154(b) by 0 days. days.

(21) Appl. No.: 15/637,263

(22) Filed: Jun. 29, 2017

(51) Int. Cl.
| | |
|---|---|
| *B60W 10/06* | (2006.01) |
| *B60W 10/10* | (2012.01) |
| *F02D 41/24* | (2006.01) |
| *F02B 75/04* | (2006.01) |
| *B60W 30/182* | (2012.01) |
| *F02N 11/08* | (2006.01) |
| *B60R 11/00* | (2006.01) |

(52) U.S. Cl.
CPC .......... *F02D 41/2487* (2013.01); *B60R 11/00* (2013.01); *B60W 10/06* (2013.01); *B60W 10/10* (2013.01); *B60W 30/182* (2013.01); *F02B 75/04* (2013.01); *F02N 11/0818* (2013.01); *B60W 2710/10* (2013.01)

(58) Field of Classification Search
CPC  F02D 41/2487; F02N 11/0818; B60W 10/06; B60W 10/10
See application file for complete search history.

(56) References Cited

U.S. PATENT DOCUMENTS

| 8,718,905 | B2 | 5/2014 | Mosher et al. | |
|---|---|---|---|---|
| 8,738,270 | B2 | 5/2014 | Emberson et al. | |
| 9,488,116 | B2 | 11/2016 | Mosher et al. | |
| 2006/0041337 | A1* | 2/2006 | Augsburger | F02D 41/2487 701/1 |
| 2013/0261942 | A1* | 10/2013 | McQuade | F02D 29/02 701/115 |

* cited by examiner

*Primary Examiner* — Edwin A Young
(74) *Attorney, Agent, or Firm* — Beyer Law Group LLP

(57) ABSTRACT

A secondary controller for controlling the performance of an automobile is described. The secondary controller can be configured to temporarily reprogram one or more vehicle controllers, such as the engine control unit, after the automobile has been powered on. The secondary controller can substitute command sets with different command sets by rewriting the corresponding portion of RAM. The secondary controller can receive vehicle information from the engine control unit to determine the particular type of vehicle to locate the particular command in RAM in order to rewrite the command set. In one embodiment, the secondary controller communicates with the vehicle controller via the vehicle's diagnostic port, such as an OBD-II port. In another embodiment, the secondary controller can be configured to control a variable displacement engine in a vehicle to command the vehicle to operate using all available cylinders.

22 Claims, 4 Drawing Sheets

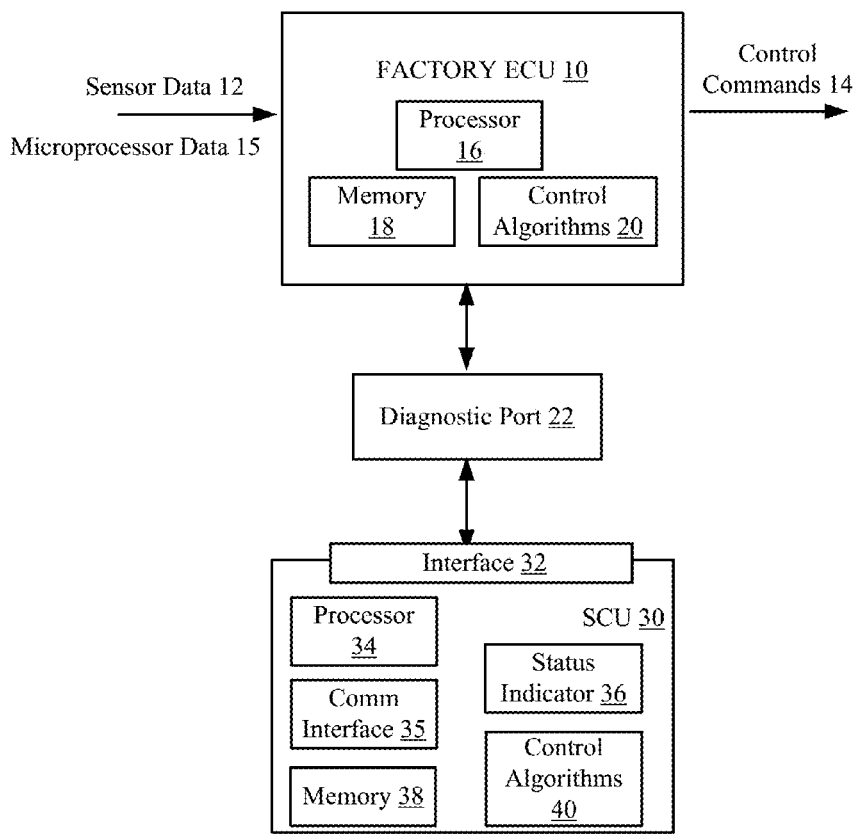
*Fig. 1*
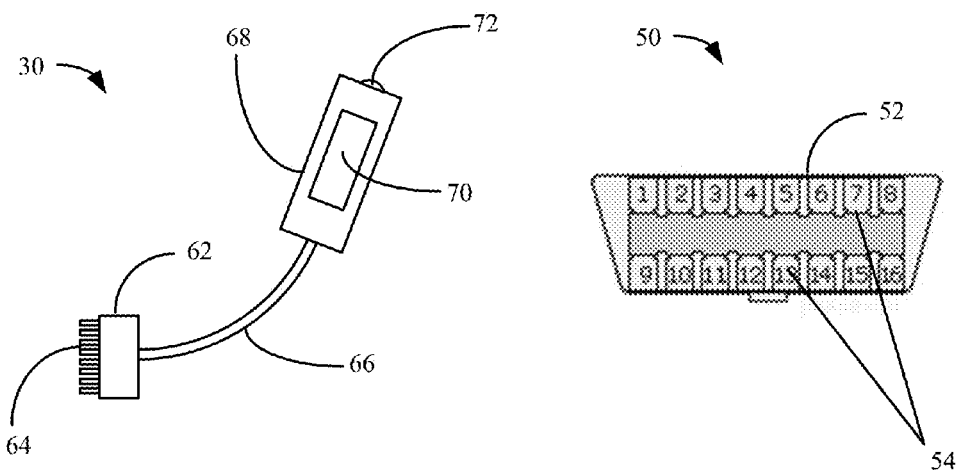
*Fig. 2A*  *Fig. 2B*

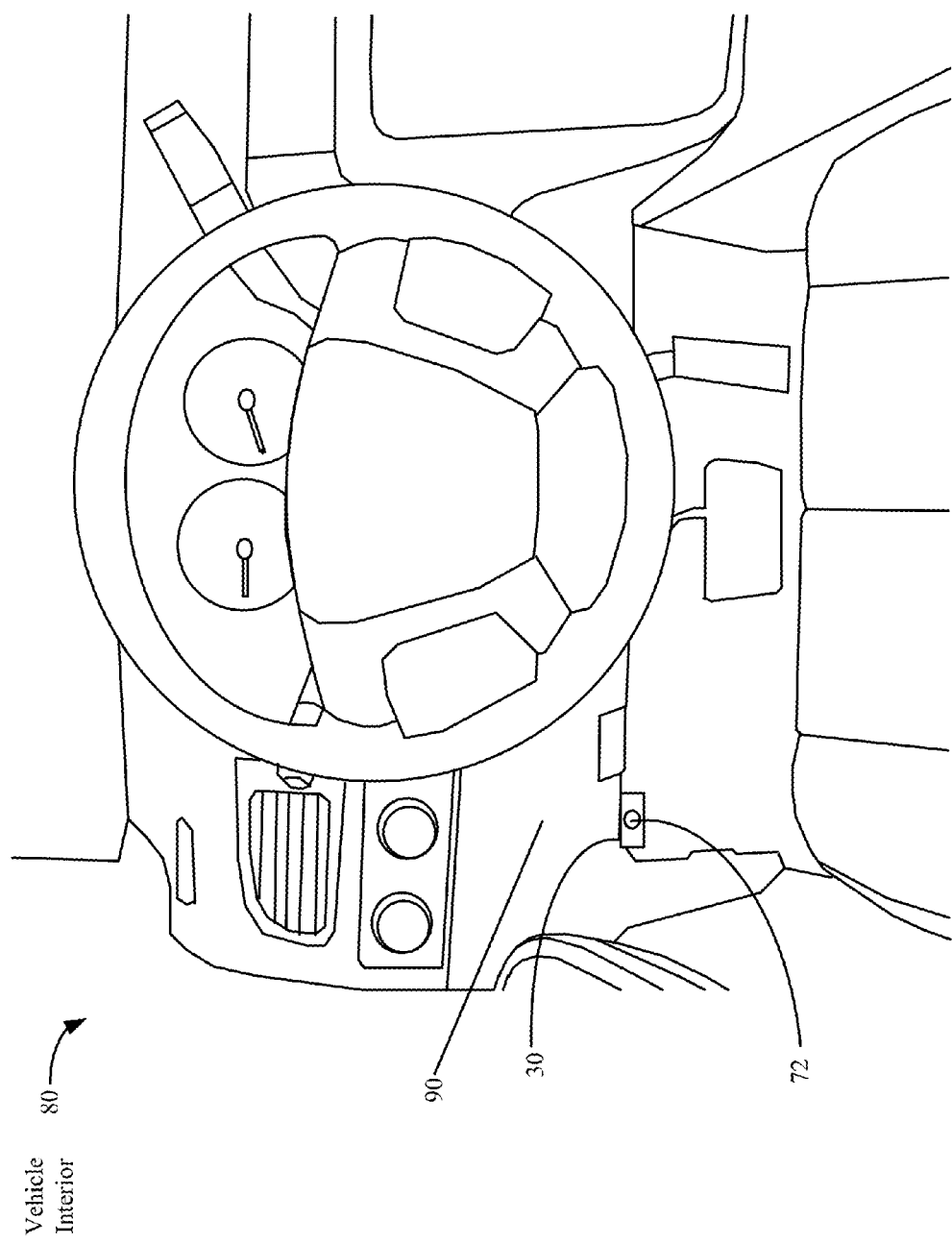

METHOD AND APPARATUS FOR MODIFYING AN AUTOMOBILE ENGINE CONTROL UNIT

BACKGROUND

Field of the Described Embodiments

The described embodiments relate generally to automobile engine control. More particularly, apparatus and method for modifying an engine control unit of an automobile are described.

Description of the Related Art

In the automobile industry, there is a large aftermarket for devices that affect the factory performance of automobiles. One class of aftermarket devices is geared toward affecting the factory engine performance of an automobile. For instance, an aftermarket engine device can be designed to boost the power of the engine under certain conditions. As another example, an aftermarket automobile device can be configured to cause the engine to burn fuel more efficiently under certain conditions to increase fuel efficiency.

Modern automobile engines include engine control units. The engine control unit determines the amount of fuel, ignition timing, and other parameters that affect the performance of an internal combustion engine. Aftermarket devices can be used to overwrite the factory software and/or data in an engine control unit to change the engine performance. For example, the factory look-up tables and/or control algorithms in the engine control unit (ECU) that are used to generate the control commands for the engine can be overwritten by such aftermarket devices. The aftermarket device can permanently overwrite the ECU (i.e. "re-flash" the ECU memory).

Some drivers may prefer to operate their vehicles in a way that is different from factory settings. Often, factory settings for an ECU are selected with the objectives of operating the engine to achieve certain objectives, such as, for example, maximizing fuel efficiency. However, to maximize fuel efficiency, engine performance can be compromised and some drivers prefer not to compromise engine performance. In view of the above, methods and apparatus are desired that allow the factory engine performance of an automobile to be temporarily modified, such as disabling certain features of an ECU that are unwanted by a driver.

SUMMARY OF THE DESCRIBED EMBODIMENTS

According to an embodiment, an electronic device for modifying a controller of a vehicle is provided. The electronic device includes a housing, a processor and a memory disposed within the housing, and an interface that allows the processor and the memory to communicate with the controller. The processor is configured to 1) detect whether the ignition has been enabled, 2) if the ignition is enabled, query the controller for information about the vehicle, 3) authenticate with the controller, and 4) provide a different substitute command set to RAM.

According to another embodiment, a method is provided for temporarily reprogramming a controller of a vehicle. Information about the vehicle is received from the controller to determine memory location in RAM for an operation to be modified. A session is then authenticated with the controller. A command for the operation from RAM is replaced with a substitute command set that is different from the command set for the operation. The substitute command set remains active while the vehicle remains in an operating state. When the vehicle is switched off, the substitute command set is erased and the controller returns to its original state.

BRIEF DESCRIPTION OF THE DRAWINGS

The embodiments will be readily understood by the following detailed description in conjunction with the accompanying drawings, wherein like reference numerals designate like structural elements, and in which:

FIG. 1 shows a block diagram of a native ECU in an automobile coupled to a secondary control unit (SCU) in accordance with the described embodiments.

FIG. 2A shows an example of a secondary control unit (SCU) in accordance with the described embodiments.

FIG. 2B shows an example of an on-board diagnostic interface for an automobile in accordance with the described embodiments.

FIG. 3 shows an example of a secondary control unit (SCU) mounted to the interior of an automobile in accordance with the described embodiments.

DESCRIBED EMBODIMENTS

Numerous specific details are set forth herein to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Most modern automobile engines include an engine control unit (ECU). The ECU includes software and data for generating control parameters related to the operation of the engine, such as control of the fuel mixture, control of the ignition timing, and control of the idle speed. Typically, a diagnostic and reporting capability is provided that allows data from the ECU to be accessed. The diagnostic and reporting capability can be used to access and fix problems associated with the engine.

Since 1996, the On-board diagnostic (OBD)-II specification has been made mandatory for all cars sold in the United States. Further, a version of OBD-II, EOBD and JOBD, are used in vehicles sold in Europe and Japan, respectively. The OBD-II standard specifies the type of diagnostic connector and its pin-out, the electrical signaling protocols that are available, and the messaging format used for communications. It also provides a candidate list of vehicle parameters to monitor along with how to encode the data for each. In addition, the OBD-II standard provides an extensible list of Diagnostic Trouble Codes (DTC)s. As a result of this standardization, a single device can query the on-board computer(s) in most vehicles.

Figure 4:
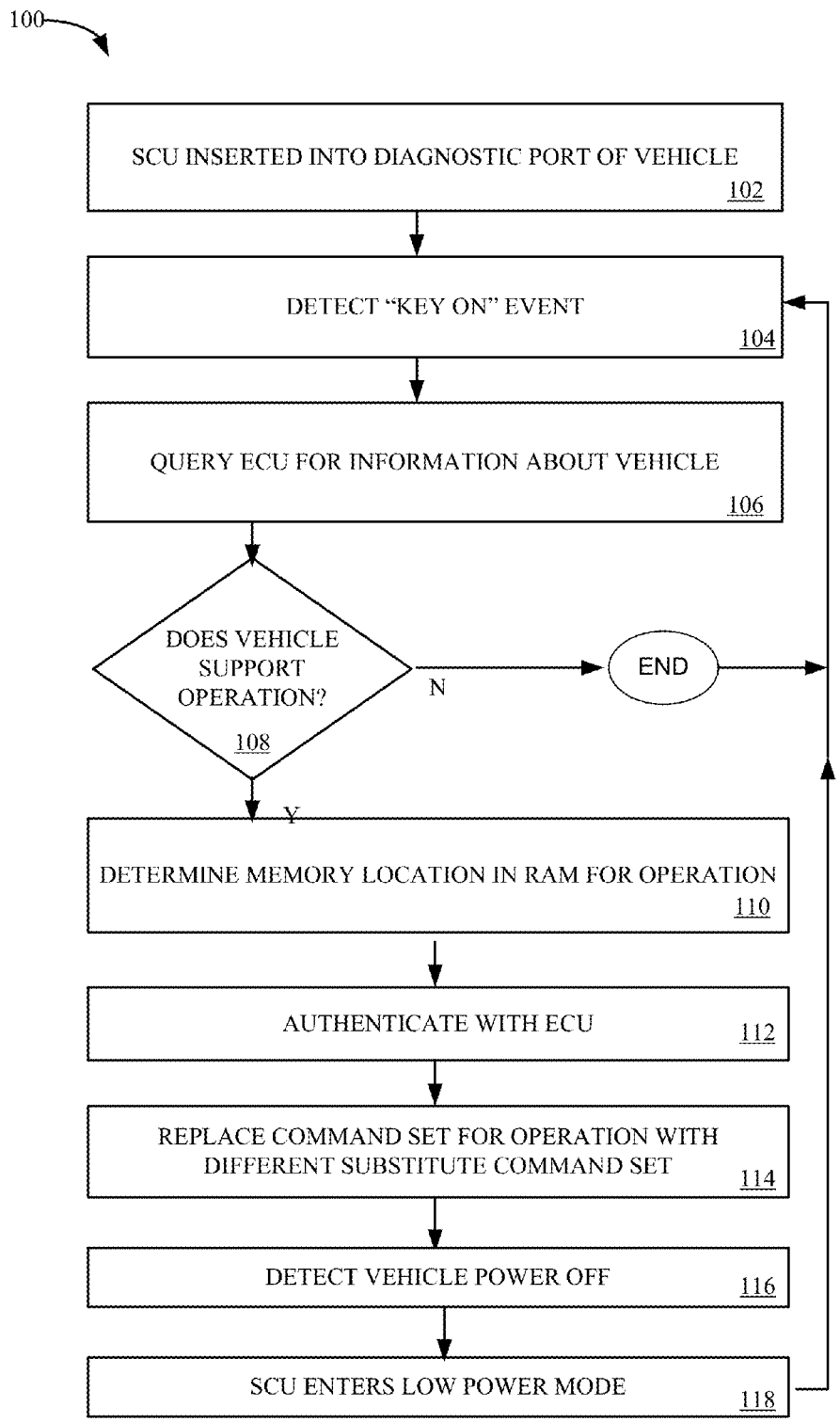
FIG. 4 is a flow chart of a method for controlling a vehicle subsystem in accordance with the described embodiments.
Figure 5:
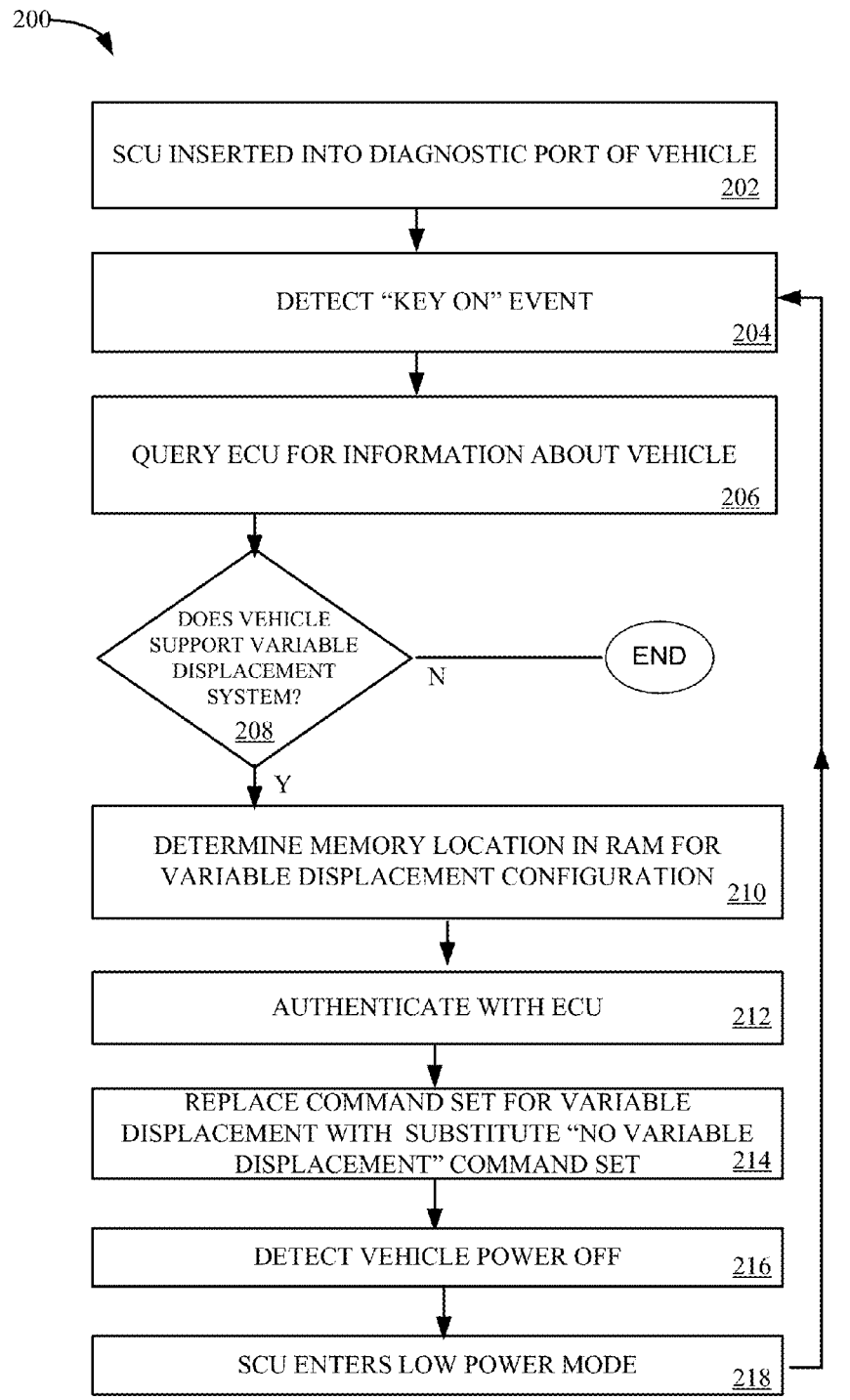
FIG. 5 is a flow chart of a method for controlling a variable displacement engine in a vehicle in accordance with an embodiment.

In more detail, with respect to FIG. 1, a block diagram of a secondary control unit (SCU) coupled to an ECU is described. The SCU can be configured to control operation of a vehicle sub-system component, such as the engine, using a bi-directional function. As is shown in FIG. 2A, in one embodiment, the SCU can be provided as a dongle configured to interface with an OBD-II diagnostic interface. The OBD-II diagnostic interface is discussed with respect to FIG. 2B. With respect to FIG. 3, the mounting of an apparatus, such as the apparatus shown in FIG. 2A, within the interior of a vehicle is described. In FIG. 4, a method of controlling of a vehicle subsystem using a SCU is described. In FIG. 5, a method of modifying control of a vehicle's variable displacement system using a SCU is described.

FIG. 1 shows a block diagram of a factory ECU 10 in an automobile coupled to a SCU 30. First, some details of the factory ECU 10 are described. The details include the configuration of the factory ECU 10 and how it communicates with other vehicle component. Next, details of an SCU 30 that can affect operations of the vehicle via communications with vehicle components, such as the factory ECU 10 are described.

The factory ECU 10 can include a processor 16, control algorithms 20 executed by the processor and a memory 18. The memory 18 can store data, such as look-up tables, used by the processor 16 when executing the control algorithms 20. As described above, some aftermarket devices permanently overwrite all or a portion of the data in memory 18 and/or the control algorithms 20. In particular embodiments, as described herein, the data in memory 18 and the control algorithms 20 are only temporarily overwritten and the original memory and algorithms are preserved so that the factory ECU 10 remains in the original state as provided by the manufacturer.

The term factory ECU 10 denotes that the engine control unit is operating with software or firmware as supplied by the manufacturer, such as the software/firmware installed in the ECU at the factory during the original manufacture of the vehicle as well as software/firmware upgrades provided by the manufacturer and subsequently installed on the ECU. For the purposes of this description, an ECU where the control algorithms and/or data used in the control algorithms has been modified by someone or some device not provided by the original manufacturer, such as via a third-party aftermarket device, is not considered a factory ECU for the purposes of this description.

The factory ECU 10 can be configured to communicate with and receive data from a number of microprocessors distributed throughout the vehicle. For example, a modern vehicle can include 40-50 such microprocessors associated with various subsystems. Some of these microprocessors can be coupled to sensors. Thus, the factory ECU 10 can be configured to receive sensor data 12 from various sensors distributed throughout the vehicle, such as temperature and pressure sensors associated with the operation of the engine. The factory ECU 10 can be configured to send control commands 14 to various vehicle subsystems. For instance, the factory ECU 10 can send out a command that affects the idle speed of the vehicle or the operation of the variable displacement subsystem in the engine.

The factory ECU 10 can communicate with and receive data from various modules, which can include sensors and other microprocessors, via a vehicle communication bus. One type of vehicle communication bus is a CAN (controller area network) bus or the CAN-bus. The bus conductor for the CAN-bus can be generated from different wire configurations. For instance, the CAN-bus can be provided on a single wire, a twisted pair of wires or a fiber optic cable. Thus, SCU 30 can be configured to interface with different types of vehicle communication bus conductors.

Different communication protocols can be implemented on the vehicle communication bus. The communication protocols specify the format of messages transmitted on the vehicle communication bus. One example of a communication protocol that can be utilized is the CAN protocol. It allows automotive components to communicate on a single or dual-wire networked data bus at speeds up to 1 Mbps. The communication speed that is implemented on the CAN-bus can vary from manufacturer to manufacturer. Thus, the SCU 30 can be configured to operate at different communication speeds depending on the communication speed associated with the electronics of a particular vehicle. Other examples of communication protocols can also be utilized on a vehicle communication bus include CAN, SAE J1939, GMLAN, OBD II, and SAE J1587. The SCU 30 can be configured to communicate using one or more of these protocols. For instance, in one embodiment, the SCU 30 can be configured to communicate using a first communication protocol when connected to a first vehicle and communicate using a second communication protocol when connected to a second vehicle.

Devices connected to the CAN-bus are referred to as nodes. Each node that is attached to the CAN-bus may be capable of sending and receiving signals. The nodes each have their own unique address on the network. Thus, each node can receive the inputs and data it needs to function, while ignoring information intended for other nodes that share the network. When a node transmits information over the network, the information is coded so all the other modules recognize where it came from.

Each node on the CAN-bus can include a host processor, a CAN controller and a transceiver. The host processor decides what received messages mean and which messages it wants to transmit itself. Sensors, actuators and other control devices can be connected to the host processor. The CAN controller includes a synchronous clock used to determine when to send messages. It stores received bits serially until an entire message is available at which time the message can be fetched by the host processor. The host processor can send messages to the CAN controller, which can then transmit the bits associated with the message serially onto the bus. The transceiver, which can be integrated into the CAN controller, can perform signal conditioning such as converting signal levels from the bus to levels that the CAN controller can interpret and converting signal levels from the CAN controller into a format compatible with the CAN-bus. As is described more detail as follows, the SCU 30 may be configured to communicate on the CAN-bus and thus, may include the components that allow it to act as a node on the CAN-bus.

Returning to FIG. 1, in one embodiment, a SCU 30 can be configured to communicate with the factory ECU 10 via the diagnostic port 22. A standard configuration for a diagnostic port 22 that is compatible with OBD-II is described below with respect to FIG. 2B. In some vehicles, the vehicle communication bus, such as the CAN-bus, can be accessed via the diagnostic port 22, such that a device connected to the diagnostic port 22 may send messages that are routed on the vehicle communication bus. In other vehicles, direct access to the vehicle bus may not be enabled via the diagnostic port 22. One reason to limit direct access to the vehicle communication bus from a device connected via the diagnostic port is that improper communications on the vehicle communication bus can interfere with critical commands needed for operating the vehicle.

In alternate embodiments, the SCU 30 can be coupled directly to the vehicle communication bus, such as a CAN-bus. If the SCU 30 is CAN compliant, it can include a CAN controller and transceiver that allows it to function as a node on the CAN-bus. Further, it can include an interface that allows it to be directly connected to the vehicle communication bus.

When the SCU 30 is configured to communicate on the CAN-bus via the diagnostic port 22 or some other interface to the CAN-bus (e.g., a direct connection), the SCU 30 can include a memory storing information that allows it to address different nodes on the CAN bus. Each node can have a different address and the CAN addresses can vary from manufacturer. Thus, if the SCU 30 is configured to operate with different vehicle types, the memory can include CAN addresses for multiple vehicles types. When installed in a particular vehicle, the SCU 30 can be configured to utilize the CAN addresses that are compatible with the vehicle type in which it is installed.

Via the diagnostic port 22 and/or another interface that provides access to the vehicle bus, the SCU 30 can monitor the status of the vehicle while it is moving, such as when a user is driving the vehicle. For instance, the SCU 30 can obtain current vehicle operating parameters, such as the engine RPM, temperatures and pressures associated with various sensors, an accelerator pedal position, a load on the engine, etc. Obtaining this information may involve bi-directional communications with various vehicle controllers. For instance, the SCU 30 can be configured to communicate with the factory ECU 10 or a transmission control unit (TCU) in a bi-directional manner. In addition, the SCU 30 can be configured to send commands associated with various self-tests and diagnostics available on the vehicle. Each vehicle controller on the vehicle communication bus can be enabled with different self-tests and diagnostics that are implemented when the controller receives the proper command. In response to the commands associated with the self-tests and diagnostics, the SCU 30 can receive information, such as but not limited to, an acknowledgement that the command was carried out, b) an acknowledgement that the command wasn't carried out and possibly a reason why the command wasn't carried out and/or c) the data associated with the implementation of the command.

The self-tests and diagnostics and their associated commands can vary from vehicle to vehicle. In one embodiment, the SCU 30 can be compatible with multiple vehicle types. Thus, the SCU 30 may store commands and control algorithms tailored to the self-tests and diagnostics available on each vehicle. When installed in a particular vehicle, the SCU 30 may determine the type of vehicle in which it is installed and self-configure to be compatible with the vehicle. In another embodiment, the SCU 30 can include an interface that allows the vehicle type to be set on the device, such as via a user input.

A vehicle can include many different types of control units that control various aspects of the vehicle. Each of the control units can be configured to accept different control commands including the self-test and diagnostic commands. In various embodiments, the SCU 30 can be configured to utilize any type of control command recognized by a control unit on a vehicle, such as the ECU.

In some instances, the control commands which are available through a vehicle interface, such as the diagnostic port, can be limited in some manner. For instance, the ECU can be configured to block or ignore certain control commands that are available on the vehicle when they are received via the diagnostic port. In some embodiments, the SCU 30 can be configured with logic or a physical interface that bypasses a command block implemented on a vehicle so that a control command generated by the SCU 30 that would normally be blocked is accepted. In other embodiments, the software in the ECU can be modified in some manner to remove the block that prevents a control command issued from the SCU 30 from being utilized.

The SCU 30 can include an interface 32 that allows for communications with various vehicle components, such as a vehicle's ECU or TCU (Transmission Control Unit). In one embodiment, the interface 32 is a connector with a wire lead where the connector is compatible with a vehicle interface, such as the diagnostic port 22. In a particular embodiment, the connector can be compatible with an OBD-II interface port. In another embodiment, the connector can be compatible with an available port that allows for communications on the vehicle communication bus, such as a CAN-bus.

In yet another embodiment, a wireless communication link can be used between the connector to vehicle interface and the body of the SCU 30. Thus, a wire lead may not be required. The vehicle interface may allow power to be transferred from the vehicle to the SCU 30. When a wireless communication interface is used, the SCU 30 may include its own power supply in lieu of receiving power from the vehicle.

In the SCU 30, the interface 32 can be coupled to a communication interface 35. The communication interface 35 can format communications to be compatible with a particular communication protocol. For instance, the communication interface 35 can format voltage level of the communications to be compatible with the diagnostic port 22 or a CAN-bus (not shown). In one embodiment, as described above, the communication interface can include a CAN controller and a CAN compatible transceiver so that the SCU 30 can act as a node on a CAN-bus.

The processor 34 communicates with vehicle components, such as but not limited to the factory ECU 10, via the communication interface 35 and interface 32. The processor 34 can be configured to format the communications to be consistent with one or more different communication protocols, such as but not limited to CAN. The memory 38 can store information used to enable the communications, such as protocol specific data. Further, it can store information that allows specific vehicle components to be addressed, such as CAN addresses on the CAN bus.

As described above, the processor 34 can be configured to issue one or more different control commands that are associated with self-tests and diagnostics available on the vehicle. The control commands can be used to affect one or more different vehicle subsystems, such as the engine or the transmission. As an example, the processor 34 can be configured to issue control commands that affect the engine displacement, the spark timing and/or the torque controller.

The processor 34 can be configured to execute control algorithms 40 that determine when to issue the control commands. The control algorithms can be affected by the vehicle operational state data. The processor 34 can be configured to monitor the vehicle's operational state and receive data associated with the current operational state, such as the latest data from various sensors disposed within the vehicle. As an example, as will be described in more detail below, accelerator pedal position data can affect a control algorithm the determines when to issue a control command requesting a vehicle to change its engine displacement. Further details of the control algorithms are described below with respect to FIGS. 4-5.

In various embodiments, the control algorithms 40 can be configured to determine whether to issue one or more control commands that control 1) a single vehicle component, such as the engine, 2) multiple vehicle components, such as the engine and transmission, 3) a single aspect of each of the controlled vehicle components, such as the displacement of the engine, and 4) multiple aspects of each the controlled vehicle components, such as the engine displacement, spark timing and fuel mixture. For instance, a control algorithm can be configured that affects the engine and the transmission. After issuing a control command that affects the engine performance (e.g., a change in the displacement of the engine, the control algorithm may issue a control command that affects the transmission to improve the drivability of the vehicle. The control algorithms and/or data utilized by the control algorithms can be stored in an encrypted format.

The SCU 30 can include one or more status indicators 36, such as, but not limited to, a light source. In one embodiment, the status indicator 36 can be activated when the SCU 30 is activated and operating properly. In another embodiment, the processor 34 can be configured to control the status indicator 36 to convey an operational characteristic of the SCU 30. For instance, each time a command set is issued by the SCU 30, the processor 34 can be configured to cause the status indicator 36 to change, such as to blink on and off when a light is used for the status indicator. Other types of status indicators besides a light source can be utilized. For instance, an audio mechanism or a vibration mechanism can be used to indicate a status of the SCU 30. In another example, a small display can be coupled to the SCU 30. The processor 34 can be configured to output status information associated with the SCU 30 to the display.

The SCU 30 can include a power source, such as battery. The power source can be used to provide power to the SCU components, such as the processor 34. In another embodiment, the SCU 30 can be configured to draw power from a vehicle to which it is coupled. For instance, there is a pin in an OBD-II connector (see FIG. 2B) that provides power from the vehicle battery. Thus, the SCU 30 may not include its own internal power source.

There are other methods for changing the performance of an engine from the performance dictated by the factory ECU. In older cars, a large set of operational tables is included in the factory ECU that allows the ECU to determine how to operate the various engine components under different conditions. In newer cars, the ECU includes logic that simulates the operation of the engine and determines how to operate the various engine components to achieve a particular operational state, such as an output of some torque amount. The engine simulation utilizes calibration tables. The operational tables or calibration tables are typically stored in a memory on the ECU.

One method of changing the engine performance is to permanently alter the operational tables stored in memory. For instance, the operational tables or calibration tables stored in the memory can be replaced with new tables. As the tables are needed for the vehicle to operate, the replacement is done while the vehicle is non-operational. However, in embodiments described herein, the ECU is temporarily reprogrammed after the ignition is enabled and the ECU returns to its original state after the vehicle is powered off.

Another method is to replace the entire ECU. The new ECU can include control algorithms using operational tables or calibration tables that are totally different than what is provided on the factory ECU. The new ECU operates the engine according to its logic and data. Since the ECU is required to operate the engine, this modification is necessarily performed while the vehicle is non-operational.

Another method of changing the engine performance is to intercept and alter data before it reaches the ECU. The ECU can base its operations on data received from various sensors. With older vehicles, such as vehicles employing operational tables, devices can be used that intercept the sensor data and replace it with new sensor data while the vehicle is operating. The engine performance is modified from how it would normally operate because the ECU is receiving false data. In newer cars employing an engine simulation, this approach often doesn't work because the ECU can determine, based upon the engine simulation, that the sensor data is not consistent with how the engine is currently operating. Thus, the modified data can cause the ECU to trigger an error condition.

Another method of changing the engine performance is to send commands directly from a SCU connected to the OBD-II port and which override existing ECU commands while the vehicle is operating. Some of these methods of changing the engine performance are described in U.S. Pat. No. 8,718,905, U.S. Pat. No. 8,738,270 and U.S. Pat. No. 9,488,116. The aforementioned patents are hereby incorporated by reference herein for all purposes.

In embodiments described herein, the operational or calibrations tables do not have to be replaced, the factory ECU does not have to be replaced, vehicle data does not have to be falsified and direct override commands do not have to be continuously sent to the ECU while the vehicle is operating. Thus, the operational bounds of an engine under various conditions proscribed by the factory ECU can be preserved. However, within the operational bounds dictated by the factory ECU, the performance of the engine can still be modified. According to embodiments described herein, an aftermarket device can temporarily modify the ECU algorithms in a non-permanent way. The modification of the engine control unit can be performed while the automobile is in an operational state, i.e., after the ignition has been switched on such that the vehicle can be driven with the modified ECU. After the vehicle is turned off, the ECU returns to its original, un-modified state with factory settings.

Next, some possible SCU device configurations are described. These configurations are described for the purposes of illustration and are not meant to be limiting. For example, FIG. 2A shows one configuration of a SCU 30. The SCU 30 includes a housing 68. The processor 34, memory 38, communication interface 35 and control algorithms 40 can be located within the housing. The housing 68 can be formed from a suitable material, such as a metal or plastic. The shape of the housing may be approximately rectangular. However, the shape of the housing is provided for illustrative purposes and different shaped housing can be utilized.

A mounting interface 70 is coupled to the housing 68. In one embodiment, the mounting interface can be a Velcro™ strip coupled to the housing via an adhesive, such as a double-sided tape. A compatible Velcro™ strip can be mounted to a vehicle surface using an adhesive allowing the SCU 30 to be mounted to a vehicle surface. In another embodiment, a bracket can be provided. The bracket can be attached to a vehicle surface. The housing 68 can be shaped so that when coupled to the bracket a suitable connection is formed between the housing and the bracket.

A translucent cover 72 covering a light source is shown mounted to the housing 68. The light source can be used as a status indicator. The translucent cover 72 and associated light source is shown at one end of the housing but in alternate embodiments, the translucent cover and light source can be located at different locations on the housing. The translucent cover 72 and mounting interface 70 can be arranged such that the status indicator associated with the translucent cover 72 is visible to a user when the SCU device 30 is mounted in a vehicle.

A wire cable 66 extends from the housing 68. A connector 62 is coupled to the wire cable 66. A number of pins 64 extend from the connector. The connector 62 is configured for compatibility with a vehicle interface. In one embodiment, the connector 62 can be shaped to for compatibility with an OBD-II interface. An example of OBD-II interface 50 is shown in FIG. 2B. It includes 16 pins and a particular shape 52. The connector shape 62 and pins 64 may fit the shape 52 and align with the pin-acceptors on the OBD-II plug. As described above, other type connectors can be utilized and this example is provided for the purposes of illustration only.

FIG. 3 shows an example of a SCU 30 mounted to the interior of an automobile in accordance with the described embodiments. In one embodiment, the SCU 30 can be mounted to a surface on the vehicle's interior 80. Typically, the OBD-II diagnostic port is located within 2 feet of the steering column. Thus, in some embodiments, the SCU 30 can be mounted on a surface near the steering column after it is coupled to the OBD-II diagnostic port. If the OBD-II diagnostic port is located at some other location in the vehicle interior 80, then the SCU 30 can be located near this location.

If another type of interface is used to couple the SCU 30 to the vehicle, such as an interface compatible with a vehicle's CAN-bus. The SCU 30 can be mounted in a different location. In other embodiments, the SCU 30 can be mounted underneath the hood of the vehicle in the engine compartment or can be mounted in a trunk of the vehicle.

The SCU 30 is shown mounted to a panel 90 that extends beneath the steering wheel. The SCU 30 is mounted to a bottom surface of the panel 90 such that the SCU is in a proximately horizontal position and the translucent cover 72 of the status indicator is visible to the user. In other embodiments, the SCU 30 can be mounted to a surface, such as a surface of panel 90, which is more vertically orientated. For example, it can be mounted to portion of the panel above the location shown in FIG. 3. Thus, the mounting location shown in FIG. 3 is provided for the purpose of illustration and is not meant to be limiting.

FIG. 4 is a flow chart of an embodiment of a method 100 for controlling a vehicle subsystem via a SCU in accordance with an embodiment. In 102, before the vehicle is started, the SCU is inserted into the diagnostic port of the vehicle. In 104, the SCU detects a "key on" event (i.e., the ignition has been switched on or enabled). That is, if the vehicle is powered on, the SCU detects that the vehicle has been started and the start up sequence of the vehicle has been initiated. If the SCU detects a "key on" event, the SCU wakes from "sleep mode" and in 106 the SCU then queries the ECU for information about the vehicle. Such information can include the ROM identification, operating system, part numbers (e.g., software version) and VIN number. The information is used by the SCU to identify the type of vehicle with which it is being used. For example, the VIN number can be used to determine if the vehicle is a truck, car, or wagon as well as the year, make, and model of the vehicle and the type of engine if has (e.g., V6 or V8 engine).

The SCU can use such information to determine how to communicate with and temporarily reprogram the ECU (or any other electronic module that controls a vehicle function). According to this embodiment, the SCU is not sending any commands to the ECU but rather temporarily reprograms the ECU while the vehicle is operating. For example, an engine may have both a variable displacement system and a non-variable displacement version. In an embodiment, the SCU reprograms the ECU such that the engine operates only in non-variable displacement mode. In this embodiment, when the variable displacement system command set is being loaded to RAM, SCU replaces the command set with a modified substitute command set. The command set is replaced before the ECU is ready to run the engine (i.e., ignition is enabled but the engine is not running or :key on/engine off"). Typically, the ECU checks for the command set only after the engine is running and "locks" RAM. RAM must be running in order for the vehicle information (e.g., ROM identification, operating system, part numbers, and VIN number) to be provided to the SCU. In this embodiment, at 108, the SCU determines whether the vehicle supports a particular operation of the engine or transmission (e.g., variable displacement system as described in more detail with reference to FIG. 5). If the SCU determines that the vehicle does not support the particular operation of the engine or transmission, then the method ends and the SCU enters a low power mode until the SCU detects a new "key on" event. If the SCU determines that the vehicle does support the particular operation, then at 110 the SCU determines the memory location for the particular operation in the RAM so that the SCU can replace the command set for the operation. In 112, the SCU then establishes/authenticates a session with a controller in the vehicle, such as the ECU, in order to communicate with the controller. Once the session has been established, the SCU intercepts the command set for the operation and substitutes a new command set for the operation in 114, effectively temporarily reprogramming the ECU. To substitute the command set, the SCU rewrites that particular portion of the RAM that was identified as the memory location for the operation. For example, if the command set to the engine is for variable displacement operation, then the SCU replaces that command set and sends a substitute command set to the engine to not operate under the variable displacement mode but to always operate in a particular displacement mode, such as 6 cylinders or 8 cylinders. In another example, the operation can be related to the transmission, such as sport driving mode or a normal driving mode or a gear in which the transmission is operating. In this embodiment, the SCU can send a substitute command set to the transmission to always operate in sport driving mode. According to another embodiment, the operation can be related to a start/stop system. Typically, in vehicles that have a start/stop system, the internal combustion engine automatically shuts down when the vehicle is stopped and restarts when the driver releases the brake in order reduce the amount of time the engine is idling and thereby reduces fuel consumption and emissions. However, some drivers may dislike the delay associated with the start/stop system and may wish to disable it, and the SCU may be used to reprogram the ECU to disable the start/stop feature. Another feature that can be modified or disabled is hill control. In yet another example, the current state of the vehicle can be characterized from sensor data associated with various vehicle components, such as, but not limited to, an 1) RPM of the engine, 2) a temperature of the engine at a particular location, 3) a pressure of the engine at a particular location or 4) a position of the accelerator pedal. As described above, the command set may be sent via the diagnostic port on the vehicle, such as an OBD-II port.

The SCU can receive an acknowledgement from the vehicle, such as from the ECU, indicating whether the substitute command set has been implemented. After the substitute command set has been sent to the controller, the vehicle continues to operate in the operational mode in which it was commanded to operate by the SCU until the vehicle is powered off. After the SCU detects that the vehicle has been powered off in 116, the SCU then enters a low power or sleep mode in 118. When the vehicle is powered off, the substitute command set is erased from the ECU. The SCU remains in low power mode until it detects a new "key on" event. When the vehicle is powered on the next time, the ECU will have returned to its factory settings.

FIG. 5 is a flow chart of a method 200 for controlling a variable displacement engine using a SCU in accordance with an embodiment. The variable displacement engine can include two or more displacement mode. For instance, an 8 cylinder engine can be configured to operate using 8, 6 or 4 cylinders. In another example, an 8 cylinder engine can be configured to operate using 8 or 4 cylinders. With a variable displacement system, a controller (e.g., ECU) of the vehicle can be configured to control operation of the vehicle in each of its two or more displacement modes. In one embodiment, the method can be designed to favor engine modes that increase the fuel efficiency of the vehicle. According to another embodiment, the method can be designed to favor an engine mode that uses all available cylinders. An example of vehicles that include an eight cylinder engine that is configured to operate in a 8 cylinder mode or a 4 cylinder mode are 2007 and later model years of the Chevy Tahoe™, Yukon™ and Escalade™ by General Motors, 2005 and later model years of Ram 1500™ trucks, LX platform (Challenger™, Charger™, 300C™, and variants) by Chrysler/Dodge, Odyssey™, Civic™, Accord™ (V6 to V3) by Honda as well as emerging and pending series of models from Ford, Audi, Volkswagen and other manufacturers.

In 202, the SCU is inserted into the diagnostic port of the vehicle. The SCU remains in a low power sleep mode until it detects a "key on" event in 204. In 206, the SCU queries the ECU for information (e.g., ROM identification, operating system, part numbers (e.g., software version) and VIN number) about the vehicle in order to identify the vehicle.

In one embodiment, a vehicle can include a variable displacement system that determines which cylinders on the engine are enabled at a particular time while the vehicle is moving. The SCU can determine whether the vehicle has a variable displacement system and therefore whether the vehicle supports operation in variable displacement mode in 208. If the SCU determines that the vehicle does not support operation in variable displacement mode, then the SCU enters a low power sleep mode. According to an embodiment, the SCU can report the unsupported strategy ID (e.g., variable displacement system) via a front panel interface. If the SCU determines that the vehicle supports variable displacement system, then the SCU determines the memory location in RAM for variable displacment configuration in 210 based on the information the SCU received about the vehicle in 206.

The SCU then establishes/authenticates a session with the ECU in 212 in order to communicate with the ECU. Once the session has been established, the SCU replaces the command set for variable displacement mode with a new substitute command set for "no variable displacement" in 214, effectively temporarily reprogramming the ECU to operate the transmission using all cylinders. To substitute the variable displacement command set, the SCU rewrites that particular portion of the RAM that was identified as the memory location for variable displacement.

If the SCU detects that the vehicle has been powered off in 216, then the SCU enters a lower power sleep mode in 218. When the vehicle is powered on the next time, the ECU will have returned to its factory settings.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. An electronic device for modifying a controller of a vehicle, the electronic device comprising:
    a housing;
    a processor and a memory disposed within the housing;
    an interface that allows the processor and the memory to communicate with the controller;
    wherein the processor is configured to 1) detect whether an ignition of the vehicle has been enabled, 2) when the ignition has been enabled, query the controller for information about the vehicle, 3) establish a session with the controller in order to communicate with the controller, and 4) temporarily reprogram the controller by using a different substitute command set to operate the vehicle, wherein an original command set is intercepted and replaced with the different substitute command set when the original command set is being loaded to RAM of the controller.

2. The electronic device of claim 1, further comprising a connector that allows the electronic device to be coupled to a diagnostic port associated with the vehicle.

3. The electronic device of claim 2, wherein the diagnostic port is OBD-II compliant.

4. The electronic device of claim 2, wherein the diagnostic port is JOBD or EOBD compliant.

5. The electronic device of claim 2, wherein the connector is configured to receive power from the diagnostic port.

6. The electronic device of claim 1, wherein the controller is an engine control unit.

7. The electronic device of claim 6, wherein the original command set is replaced with the different substitute command set before the engine control unit checks for the original command set.

8. The electronic device of claim 7, wherein an engine is a variable displacement engine and wherein the original command set is for changing a displacement mode of the variable displacement engine and the different substitute command set is for never changing the displacement mode of the variable displacement engine.

9. The electronic device of claim 7, wherein the original command set is for operating a transmission in a first driving mode and the different substitute command set is for operating the transmission in a second driving mode, wherein the first driving mode is different from the second driving mode.

10. The electronic device of claim 7, wherein the original command set is for automatically implementing a start/stop feature that shuts down an engine when the vehicle is stopped and restarts the engine when a driver releases a brake and the different substitute command set disables the start/stop feature.

11. The electronic device of claim 7, wherein the electronic device is configured to rewrite a particular portion of the RAM that was identified as a memory location for the original command set.

12. The electronic device of claim 1, further comprising a status indicator for indicating an operational state of the electronic device.

13. The electronic device of claim 12, wherein the status indicator is one of a light, an audio device, a vibration device or a display.

14. The electronic device of claim 1, further comprising a mounting interface for mounting the electronic device to a surface of the vehicle.

15. The electronic device of claim 1, wherein the electronic device is configured to power down and enter a sleep mode after it detects that an engine of the vehicle is turned off.

16. A method for temporarily reprogramming a controller of a vehicle using a secondary control unit, the method comprising:
    inserting the secondary control unit into a diagnostic port of the vehicle before an ignition of the vehicle has been powered on;
    receiving at the secondary control unit from the controller information about the vehicle to determine memory location in RAM of the controller for an operation for controlling the vehicle to be modified;
    establishing a session with the controller in order to establish communication between the controller and the secondary control unit;
    and
    when a command set for the operation for controlling the vehicle is being loaded to RAM of the controller, replacing the command set for the operation for controlling the vehicle with a substitute command set that is different from the command set for the operation for controlling the vehicle, wherein replacing the command set with the substitute command set temporarily reprograms the controller.

17. The method of claim 16, further comprising detecting that the ignition has been enabled before receiving from the controller information about the vehicle.

18. The method of claim 16, wherein the controller is an engine control unit.

19. The method of claim 18, wherein the command set is replaced with the substitute command set before the engine control unit checks for the command set.

20. The method of claim 16, wherein the command set for the operation is operating a variable displacement engine in two or more displacement modes and the substitute command set is operating the variable displacement engine on all available cylinders.

21. The method of claim 16, wherein the substitute command set remains active until an engine of the vehicle is powered off.

22. The method of claim 21, further comprising erasing the substitute command set when the engine is powered off.

* * * * *